March 15, 1966 A. A. MARKS 3,240,478
HEATING APPARATUS AND METHOD
Filed April 8, 1963
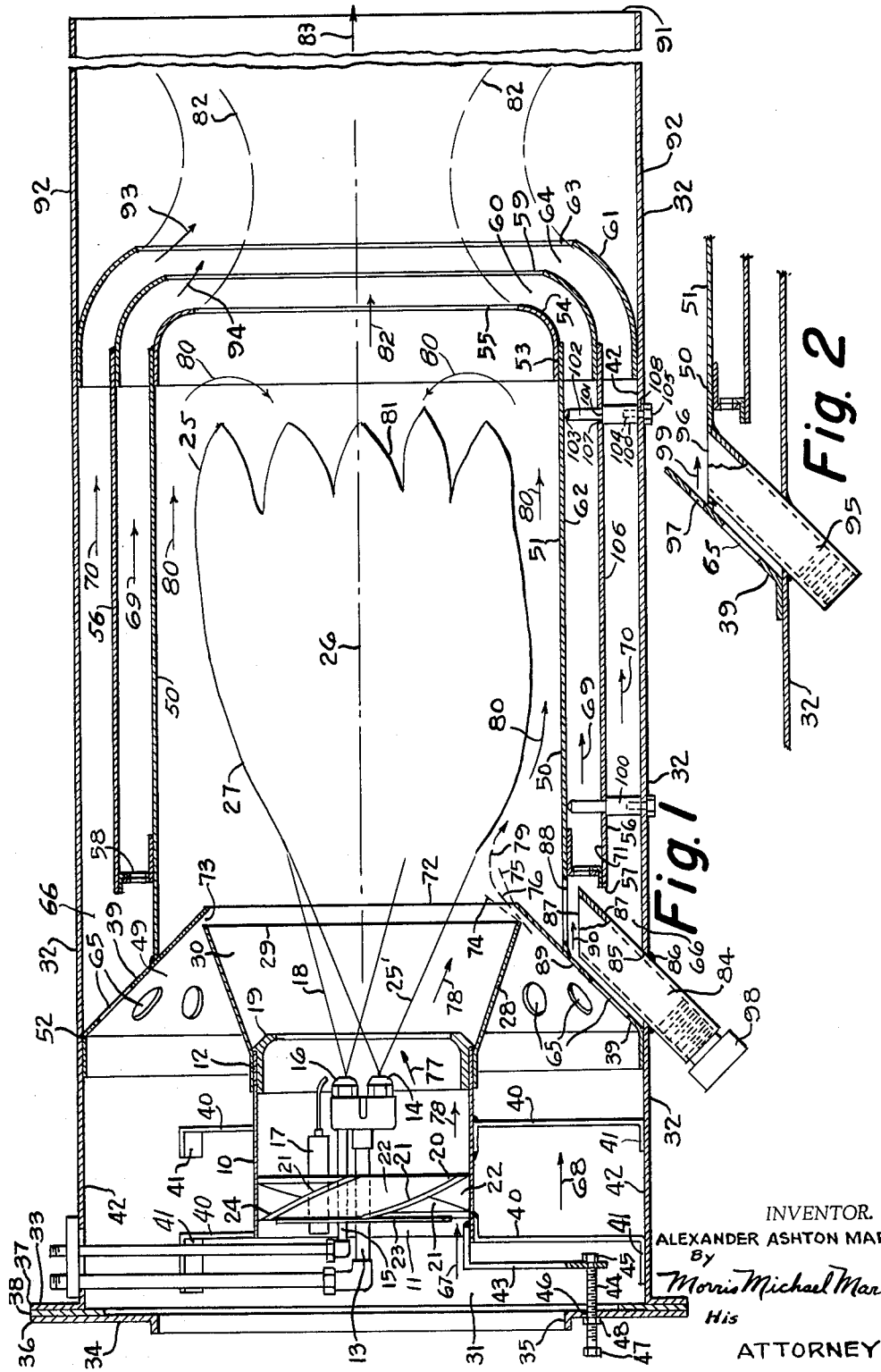
INVENTOR.
ALEXANDER ASHTON MARKS
By
Morris Michael Marks
His
ATTORNEY.

United States Patent Office 3,240,478
Patented Mar. 15, 1966

3,240,478
HEATING APPARATUS AND METHOD
Alexander Ashton Marks, 6676 Lincoln Drive,
Philadelphia, Pa.
Filed Apr. 8, 1963, Ser. No. 271,151
22 Claims. (Cl. 263—19)

My invention relates to heating apparatus and method.

One object of my invention is to provide a heater and heating method which will assure complete combustion in such a manner as to derive the maximum heat output from the fuel used.

Another object of my invention is to provide a heating apparatus and method which will produce a continuous flow of hot gas or gases, whether said flow projects for a considerable linear distance, is dispersed at the heater outlet, or is injected into a chamber or vessel. Such continuous flow may be utilized for various purposes, including but not in any manner limited to, space heating, product drying, melting operations, and combustion under submerged conditions. Also such flows may be used in jet propulsion or other devices wherein a continuous flow of heat-energized gases may be desired.

A further object of my invention is to provide means and method for imparting heat to a continuously flowing fluid with a maximum of efficiency and a minimum of heat loss.

Another object of my invention is to provide means and method for varying the linear dimension of emitted flow of heated gases without varying the dimensions of the combustion chamber outlet, and without changing the quantity of fuel or gaseous flow being utilized.

Another object of my invention is to provide means whereby a flame monitor may be used in open communication with a combustion chamber, while being protected from accumulation of products of combustion which would adversely affect its operation.

A further object of my invention is to provide means and method for simultaneously aiding combustion, insulating said means in a manner to prevent loss of heat through the exterior, and utilizing the heat absorbed in said insulating process.

Another object of my invention is to provide means and method for establishing intense and efficient combustion while protecting the combustion chamber from destructive effect of said combustion.

A further object of my invention is to provide heating apparatus of minimal size and weight, maximum utilization of heat, inexpensive and relatively simple construction, dependable and efficient operation.

Other objects of my invention may be found in the more detailed description which follows hereinafter.

For the purpose of illustrating my invention, I have shown in the accompanying drawings forms thereof which are at present preferred by me, since the same have been found to give satisfactory and reliable results, although it is to be understood that the various instrumentalities of which my invention consists can be variously arranged and organized, and that my invention is not limited to the precise arrangements and organizations of the instrumentalities as herein shown and described.

Referring now to the drawings in which like reference characters indicate like parts:

FIGURE 1 represents a longitudinal sectional view of a heating device embodying my invention.

FIGURE 2 represents a fragmentary sectional view illustrating a modified construction embodying my invention.

My invention is adapted for use with a substantially continuous gaseous flow. In instances where such flow is used to support combustion taking place in the apparatus or method of my invention, said flow may consist of a combustion-supporting fluid such as air or oxygen.

Moreover, in instances where combustion is maintained in the method or apparatus of my invention, any desirable fuel may be used; and for purposes of illustration only, there is described herein a heater means and method utilizing fuel oil which is atomized and burned in the presence of air introduced under pressure.

Also, for purposes of illustration, there is described herein an apparatus embodying my invention. Such apparatus may comprise a blast tube 10 having an inlet portion 11 and an outlet portion 12. A fuel oil inlet 13 is disposed in said blast tube 10, and terminates in a suitable fuel oil nozzle 14 preferably disposed within said blast tube upflow of the outlet portion 12 thereof. The fuel oil inlet 13 is connected by any suitable means to a source (not shown) of fuel oil supply under pressure. If desired, a suitable pilot fuel inlet 15 may also be disposed within said blast tube while leading by any suitable means from a source (not shown) of pilot fuel supply under pressure, to a suitable pilot nozzle 16 disposed in the vicinity of said fuel oil nozzle 14. Also if desired, means such for instance as the electrode 17 may be disposed in conjunction with said pilot nozzle 16 for igniting the atomized fuel 18 emitted by the pilot nozzle. A suitable air cone 19 may be disposed at the blast tube outlet 12 behind the nozzles 14 and 16.

An air swirl device 20 may be disposed within the blast tube 10, upflow of the nozzles 14, 16 in a manner substantially to traverse the path of air flow within said blast tube 10; and may comprise helical flights 21 defining spiral channels 22 therebetween. A closure member such for instance as the static disk 23 may be mounted on said air swirl device 20 in a manner to restrict flow of air thereinto, to the circumferential region 24 thereof.

Suitable controls may be used for the establishing and maintenance of a flame in conjunction with the nozzles 14, 16. Thus, when it is desired to establish a flame, a continuous flow of air may be supplied through the channel 31, and hence through the inlet 11 of the blast tube 10, being converted therein by means of the static disc 23 and the swirl device 20 into a rearwardly advancing helical flow, the radially inner portion 77 of which surrounds the nozzles 14, 16 and intercepts the paths of fuel to be emitted therefrom.

Pilot fuel under pressure is then supplied the pilot nozzles 16 to form a mist of atomized fuel 18 which is intermingled with the rearwardly advancing helical mass of air 77.

The atomized and air-intermingled fuel 18 may be ignited by a spark from the electrode 17, to form a pilot flame at the location of the fuel 18. Suitable control means, such for instance as the flame monitor 98, responds to the existence of the flaming pilot fuel 18 and may thus actuate a solenoid valve (not shown) in the supply line leading to the fuel oil inlet 13. Fuel oil may thus be supplied under pressure to the fuel oil nozzle 14, atomizing said fuel oil along the conical path 25' which itself intermingles with the rearwardly advancing helical mass of air 77. The conical path 25' intercepts the path of the flaming pilot fuel 18, thereby igniting the fuel oil emitted by the nozzle 14. Both flames will thus be emitted in merging relationship, from the rear of the blast tube 10; and the flame monitor 98 will continue to permit fuel to be fed to the nozzle 14 as long as an existing flame is being monitored by it. The combined flame 25 will thus have, in the vicinity of the nozzles 14, 16, the pattern of intercepting cones 25', 18, whose apices are at the respective adjacent nozzles 14, 16, said cones 25', 18 integrating with each other to form a generally conical pattern having an exterior burning surface 27, disposed substantially about the longitudinal axis 26.

An outwardly flared substantially conical shield 28 is preferably mounted on the blast tube 10 in the vicinity of the outlet portion 12 thereof, and terminates in an extremity or lip 29 disposed downflow of the air cone 19. The shield 28 is preferably spaced from the normal location of the flame 25. The interior surface 30 of the shield 28 thus forms a reflecting surface for the radiant heat emitted by the flame 25 while providing a guide for the swirling tubular flow of air surrounding the nozzles 14, 16 and the flame 25.

The blast tube 10 is preferably disposed within a channel 31 leading from a source (not shown) of supply of air flow. The channel 31 may if desired consist of the entrance portion of a tubular housing 32 having an outwardly extending flange 33 disposed at the end thereof. A substantially annular face plate 34 may be provided having a longitudinal collar 35 disposed about the inner edge region of the annulus of the face plate 34. The outer edge region 36 of said annulus may be disposed substantially in registry with the outer edge region 37 of the flange 33, and a suitable gasket 38 may be disposed therebetween. Bolts (not shown) or other suitable means may be utilized for holding the face plate 34 and flange 33 in air-tight relation with respect to the gasket 38. The source (not shown) of air flow may be secured by any conventional means to the collar 35.

A flow diversion member 39 may be mounted on the interior face 42 of the channel housing 32 and project inwardly therefrom substantially in the form of a truncated cone whose downflow edge or lip forms a flow guide region 72 whose diameter is substantially less than the diameter of the extremity 29 of the shield 28, and is disposed rearwardly of said extremity or lip 29.

The blast tube 10 may be mounted on a plurality of spider brackets 40, each having shoes 41 slideably disposed on the interior face 42 of the channel housing 32.

The extremity 29 of the shield 28 may be adjustably disposed with respect to the flow diversion member 39. Thus, an adjustment bracket 43 may be mounted on the blast tube 10, in the vicinity of the inlet portion 11 thereof and extend radially toward the interior face 42 of the channel housing 32, and preferably spaced therefrom. A threaded bolt 44 may be rotatably secured at one end of the bracket 43, by any suitable means such for instance as the shoulder, reduced diameter portion and locknut assembly 45. The bolt 44 may pass through a suitable opening 46 in the face plate 34 and in threaded engagement therewith, to a bolt head 47 spaced therefrom, and a nut 48 may be disposed in threaded engagement with the bolt 44 in a manner to bear against the exterior of the face plate 34. Thus, by adjusting the bolt head 47 with the nut 48, the blast tube 10 may be advanced toward or away from the face plate 34, and in the process will carry the extremity 29 of the shield 28 away from, or toward the forward face 49 of the flow diversion member 39.

A combustion chamber 50 may be mounted on the flow diversion member 39, about the longitudinal axis 26. The combustion chamber 50 preferably comprises a tubular portion 51 secured at the forward end thereof, as by welding, to the flow diversion member 39 intermediate the base region 52 thereof and the downflow edge 72. The rearward end region 53 of the combustion chamber 50 is preferably constricted as at 54 to form a discharge orifice 55.

A casing 56 may be disposed about the combustion chamber 50, and in spaced relation thereto, and also in spaced relation to the housing 32. The casing 56 comprises an inlet region 57 disposed rearwardly of said flow diversion member 39. Flow restricting means are disposed within the tubular passage or channel 71 of said casing 56, and are preferably disposed within the inlet region 57 thereof. Thus for instance, an annular baffle 58 may be disposed within said inlet 57. The rearward portion of the casing 56 is preferably contoured similar to the contour of the constricted end region of the combustion chamber 50, and terminates in an outlet orifice 59 of greater diameter than the discharge orifice 55, defining therebetween an annular outlet region 60. A truncated dome 61 may be mounted on the inner face 42 of the housing 32 in the vicinity of the constricted end regions of the combustion chamber 50 and casing 56, and may be contoured substantially similar thereto, terminating in a truncated portion 63 of greater diameter than the outlet orifice 59, and defining therebetween an annular outlet 64. In one preferred form, the housing extends substantially beyond the outlets 55, 59 and 63 to a discharge vent 91.

The flow diversion member 39 preferably has vents 65 disposed therethrough, intermediate the combustion chamber portion and the base region 52, opening into the annular passage 66 between the combustion chamber 50 and the housing 32.

In operation, as illustrated in the drawings, the channel 31 leads from the collar 35 into the housing 32, where the flow of the channel is initially divided into the blast tube flow 67 within the interior of the blast tube 10 and a tubular flow 68 exterior thereof.

Within the blast tube 10, the flow 68 is converted into a swirl by the swirl device 20; and the radially inward portion 77 of the resultant tubular swirl combines with the fuel emitted by the nozzles 14, 16 as ignited by the ignition member 17, to form the flame 25. The radially outer portion 78 of the tubular swirl surrounds the inner portion 77 and the flame 25; and constitutes an initial sheathe about the flame 25.

The tubular flow 68 exterior of the blast tube 10 is diverted by the flow diversion member 39 through which the vents 65 are disposed, and a substantial portion of said flow may pass through said vents 65 into the annular passage 66.

That portion of the tubular flow 68 exterior of the blast tube 10, which does not pass through the vents 65, is guided along the interior face 49 of the flow diversion member 39 toward the flow guide region 72 thereof. This flow is however restricted by the flared conical shield 28 terminating in the extremity 29, substantially closely upflow of the flow guide region 72 of the flow diversion member 39, resulting in a flow through the annular port 73 substantially defined by the extremity 29 and flow guide region 72. This flow is thus substantially spaced from the surface 27 of the flame 25, and comprises an initial upflow surface substantially as indicated by the dotted line 74, and an initial downflow surface substantially as indicated by the dotted line 75 defining therebetween a mainstream substantially as indicated by the dotted line 76. The stream 76 is in turn intercepted by the rearwardly advancing flow portion 78 which forms an initial sheath about the flame 25. The swirling and expanding substantially tubular mass of air 78 is thus combined with a constricting conical tubular flow which is directed toward the longitudinal axis of the flame 25, resulting in the diversion of the path of the stream emitted from the port 73 substantially as indicated at 79. In the process, the initial sheathe surrounding the flame 25 is substantially enhanced to form the rearwardly directed envelope 80 which embraces the flame 25 throughout its length. The envelope 80 thus feeds needed oxygen to the flame until combustion is completed, and in the process also serves as a cooling buffer between the flame 25 and the combustion chamber wall 51, protecting the wall 51 from direct contact with the flame. Moreover, in the process the envelope 80 is diverted by the constricted end region 54 of the combustion chamber 50, and by the flows discharged through the annular outlets 60 and 64, in a manner to embrace the rearward end region 81 of the flame 25 and to supply oxygen thereto, thereby assuring completion of combustion within the combustion chamber 50.

That portion of the flow 68 which passes through the vents 65 of the flow diversion member 39, is divided into the interior annular flow 69 through the annular channel 71 within the casing 56, and the exterior annular flow 70 between the casing 56 and the housing 32.

The interior annular flow 69 is retarded by the baffle 58 into a relatively sluggish passage through the annular channel 71, continuing therethrough until its outlet 60, where it unites with the hot products of combustion as more fully set forth hereinafter.

In the operation of the combustion chamber, the combustion chamber wall 51 while insulated from direct contact with the flame 25, nevertheless receives a substantial amount of heat therefrom, primarily by radiation. This is very desirable, for it enables the combustion chamber wall 51 in turn to re-radiate heat back toward the interior, operably substantially to aid in vaporizing the atomized oil particles emanating from the nozzles 14 and 16, further to assure completion of the combustion within the confines of the combustion chamber 50. Nevertheless, uncontrolled increase of temperature of the combustion chamber wall 51 can prove destructive of the wall itself. The relatively sluggish flow 69 provides a substantial measure of this needed control, entraining much of the heat captured by the combustion chamber wall 51 and conveying it to the outlet 60; and in a preferred form the flow 69 is maintained at a rate sufficient to cool the combustion chamber wall 51 below a deleterious temperature, without being reduced below the temperature required to re-radiate sufficient heat to vaporize the oil particles.

At the same time, the relatively sluggish flow 69 serves to insulate the casing 56 from the combustion chamber wall 51, limiting substantially to the heat of radiation, the heat captured by the casing 56. The relatively rapid exterior annular flow 70 surrounding the casing 56 entrains a substantial portion of such heat received by the casing 56, and carries it to the outlet 64. In this manner, while combustion may be taking place within the flame 25 at a temperature in excess of 2,000° F., that portion of the housing 32 which surrounds the casing 56 may be so cool that it is possible to rest one's hand thereon without discomfort. By the time the relatively sluggish flow 69 reaches the outlet 60, it has been preheated to a marked degree by its passage along the exterior of the combustion chamber wall 51, and said flow 69 initially serves as a buffer between the envelope 80 and the substantially cooler annular flow 70 surrounding it at the outlet 64. In this manner, the relatively cool outer flow 70 is inhibited from quenching the flame 25. The annular flow 70 thus may embrace the hot discharge 82 emitted through the discharge orifice 55 as enhanced by the discharge 69 flowing through the outlet 60, in a manner to be heated thereby, operably to form an ultimate hot blast mixture 83 of products of combustion and air.

In one preferred form, within the housing 32, the truncated dome 61 diverts the flow 70, as at 93 toward the longitudinal axis 26 and away from that portion 92 of the housing 32 which is disposed intermediate the truncated dome 61 and the discharge vent 91. The similar contoured outlet region 60 of the passage 56 similarly diverts the flow 69, as at 94, toward the longitudinal axis 26 and away from the outer portion 92 of the housing 32. The combined flows 93, 94 bear against the discharge 82 from the combustion chamber 50 in a manner to constrict the same and to inhibit its expansion as it approaches the discharge vent 91. Not only is the hot discharge 82 constricted, but it is surrounded by successively cooler heated envelope formed by the flows 94 and 93. Thus the outer portion 92 of the housing 32 is protected from direct contact with the hot discharge 82, thereby resulting in reduction of heat loss through the outer portion 92, and protecting the outer portion 92 from the deleterious effect of excessive heat.

The size and shape of the flow 83 emitted from the discharge vent 91, and of the flame 25 itself, may be varied at will, by suitable adjustments or substitutions. These include: adjusting the distance between the extremity 29 and the flow guide region 72; varying the size or shape of the baffle 58; varying the size of the vents 65; and varying the size of the static disc 23. Thus, by appropriate adjustments or substitutions, a substantially sharply defined, concentrated blast may be emitted through the discharge vent 91 for a considerable distance, or the discharge 83 may be diffused substantially at the discharge vent 91; or any of various intermediate patterns of discharge may be established.

If desired, means may be provided for the use of a monitor device in conjunction with the flame 25. Thus for instance, a duct 84 may be disposed through a suitable opening 85 in the housing 32 and sealed in an airtight manner with respect thereto, as by the welding 86. The duct 84 is adapted to have mounted thereon a suitable control member such for instance as a photoelectric cell 98, and is preferably disposed intermediate the flow diversion member 39 and the inlet 57 of the passage 71. The inner aperture 87 of the duct 84 is in registry with a suitable opening 88 formed through the combustion chamber wall 51, operably to provide an unobstructed survey of the flame 25 in the interior of the combustion chamber 50.

As illustrated in FIGURE 1, the aperture 87 of the duct 84 is outwardly spaced from the combustion chamber wall 51; and an auxiliary vent 89 is disposed through the flow diversion member 39 immediately adjacent said aperture 87. Thus, a portion of the flow of air 68 is diverted through the auxiliary vent 89 to form a stream 90 passing across the aperture 87. This stream 90 operates effectively to prevent the intrusion of products of combustion through the opening 88 in the combustion chamber wall and into the aperature 87 of the duct 84, which products of combustion could cover, contaminate, or otherwise disturb the dependable operation of, the flame monitor 98.

In FIGURE 2 is illustrated a modified construction embodying my invention, wherein the flame monitor duct 95 extends both through the housing 32 and through the combustion chamber wall 51, and in air-tight relation therewith, thereby opening directly into the combustion chamber 50 by means of the interior aperture 96 of the duct 95 In this construction, the auxiliary vent 97 is preferably disposed through the flow diversion member 39, in that portion thereof which extends between its junction with the combustion chamber wall 51 and the truncated edge or flow guide 72.

In this modified construction, a clean air stream 99 is thus provided directly across the aperture 96 of the duct 95, operably to protect the interior thereof and the flame monitor 98 from contact with, or accumulation of, products of combustion emanating from the combustion chamber.

The combustion chamber 50, casing 56 and housing 32 may be assembled and maintained in fixed relation to each other by any suitable means, operably to assure the continuing existence of the passages for the flows 69 and 70. One such means comprises the studs 100 each having a shoulder portion 101 and a reduced diameter pin 102 longitudinally projecting from said shoulder portion 101 and terminating in a step bearing 103; the stud 100 having an internally threaded bore 104 at its opposed end, adapted to receive a threaded bolt 105. The distance from the shoulder 101 to the end of the step bearing 103 is preferably substantially equal to the distance from the outer face 106 of the casing 56 to the outer face 62 of the combustion chamber 50.

In operation, the pin 102 is disposed through a suitable orifice 107 in the casing 56 until the shoulder 101 bears against the outer face 106 of the casing 56 and the step bearing 103 bears against the outer face 62 of the combustion chamber 50. A suitable orifice 108 is disposed through the housing 32 in registry with the threaded bore 104; and the bolt 105 is disposed through said orifice 108 and in threaded engagement with the bore 104 operably to hold the stud 100 in place. Similar studs 100 may be thus disposed about the housing 32 and in engagement with the casing 56 and combustion chamber 50 operably to support the casing 56 and combustion chamber 50 in fixed, spaced relation to each other and to the housing 32.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I claim as new and desire to secure by Letters Patent is:

1. Heating apparatus comprising:
   a channel;
   a blast tube having an outlet and disposed within said channel;
   a fuel supply line terminating in a nozzle within said blast tube, and adapted to maintain a flame emanating from the outlet of said blast tube;
   a shield disposed about said blast tube outlet and terminating in an outwardly flared extremity disposed downflow of said blast tube outlet;
   a flow diversion member disposed downflow of said extremity, and having
      a flow guide region of smaller effective diameter than that of said extremity;
   said extremity and said flow guide region defining a port through which may flow a fluid adapted to embrace said flame and to divert its direction beyond said guide region.

2. In combination, a chamber, a casing disposed about said chamber, and a housing disposed about said casing, means to retain said housing, casing and chamber in fixed, spaced relation to each other, and comprising:
   a stud having a longitudinal bore at one end and a shoulder at the other end;
   a pin longitudinally projecting from said shoulder and terminating in a step bearing;
   said pin being adapted to be disposed through an orifice in said casing and to bear against said combustion chamber when said shoulder bears against said casing;
   an orifice disposed through said housing and in registry with said bore; and
   a bolt disposed through said housing orifice and in engagement with said longitudinal bore.

3. The heating apparatus as defined in claim 1, and further characterized by:
   means for varying the size of said port, operably to vary the shape of the flame.

4. The heating apparatus as defined in claim 1 and further characterized by:
   a combustion chamber disposed downflow of said flow diversion member, and having
      an outlet;
   means for varying the size of said port, operably to vary the flow pattern of products of combustion emanating from said combustion chamber outlet.

5. The heating apparatus as defined in claim 1 and further characterized by:
   a combustion chamber disposed downflow of said flow diversion member and having an outlet and a combustion chamber wall disposed between said flow diversion member and said outlet;
   said port being adapted to divert said fluid in a manner to shield said combustion chamber wall from contact with said flame.

6. A heating apparatus comprising:
   a combustion chamber adapted to have a flame disposed therein;
   a duct leading to the interior of said chamber and adapted to have mounted thereon a flame monitor in unobstructed communication with the interior of said combustion chamber;
   said duct having an inner aperture in physically unobstructed communication with the interior of said chamber; a passageway adapted to convey a fluid therethrough and to direct said fluid in a substantially continuous stream therefrom along a predetermined path, regardless of the state of said flames; said passageway being disposed in the vicinity of said aperture with said path disposed across substantially all of said aperture and adapted to be intermediate said aperture and said flame, operably to divert products of combustion away from the interior of said duct.

7. Heating apparatus comprising:
   a blast tube having an outlet;
   means disposed within said blast tube, for maintaining a flame emanating from said blast tube outlet;
   an outwardly flared shield disposed about said blast tube outlet and terminating in an extremity;
   a flow diversion member disposed downflow of said extremity, and having a flow guide region of smaller effective diameter than that of said extremity;
   said extremity and said flow guide region defining a port;
   a combustion chamber having a discharge portion, and a combustion chamber wall disposed between said port and said discharge portion;
   a casing disposed about said wall and spaced therefrom operably to define a passage having an inlet portion and an outlet portion;
   means to retard flow of fluid within said passage;
   means to guide fluid through said port, operably to direct said fluid in a manner to shield said combustion chamber wall from contact with said flame; and
   means to guide fluid into said inlet portion.

8. Heating apparatus as defined in claim 7, and further characterized by:
   said outlet portion being disposed in the vicinity of said discharge portion;
   a housing disposed about said casing and spaced therefrom operably to form therebetween an exterior flow channel;
   means to guide fluid to said exterior flow portion, said exterior flow portion being adapted to convey fluid at a greater rate than the rate of fluid through said passage;
   said exterior flow channel having an outlet in the vicinity of said passage outlet portion; and
   said exterior flow channel outlet and said passage outlet being adapted to combine the flows emanating therefrom with the products of combustion emanating from said discharge portion.

9. Heating apparatus comprising:
   a channel;
   a blast tube having an inlet and an outlet disposed within said channel;
   means for maintaining a flame emanating from said blast tube outlet, and comprising:
      means for injecting fuel into said blast tube;
      means for diverting a flow of combustion-supporting fluid in said blast tube, said flow comprising
         an inner flow adapted to intermix with said fuel, and
         an outer flow adapted to form a sheathe about the flame emanating from said blast tube;
   an outwardly flared shield disposed about said blast tube outlet and terminating in an extremity;
   a flow diversion member disposed downflow of said extremity and having a flow guide region of smaller effective diameter than that of said extremity;

said extremity and said flow guide region defining a port;

means for varying the size of said port and comprising:
- a spider disposed between said blast tube and an inwardly facing wall;
- slide bearing shoes on said spider; and
- adjustment means secured to said blast tube and to a fixed portion of said heating apparatus, operably to vary the distance between said blast tube and said fixed portion;

a combustion chamber disposed downflow of said flow diversion member and having a discharge portion, and a combustion chamber wall disposed between said flow diversion member and said discharge portion;

said port being adapted to emit a fluid in a manner to embrace said sheathe and flame operably to shield said combustion chamber wall from contact with said flame;

a casing disposed about said wall and spaced therefrom operably to define a passage having an inlet portion and an outlet portion;

means to retard flow of fluid within said passage;

a housing disposed about said casing and spaced therefrom, operably to define an exterior flow channel therebetween;

said exterior flow channel being adapted to convey fluid at a greater rate than the rate of flow through said passage;

means to retain said housing, casing and combustion chamber in fixed, spaced relation to each other, and comprising:
- a stud having a longitudinal bore at one end and a shoulder at the other end;
- a pin longitudinally projecting from said shoulder and terminating in a step bearing;
- said pin being adapted to be disposed through an orifice in said casing and to bear against said combustion chamber when said shoulder bears against said casing;
- an orifice disposed through said housing and in registry with said bore; and
- a bolt disposed through said housing orifice and in engagement with said longitudinal bore;

means to guide fluid from said first-mentioned channel, through said flow diversion member and into said exterior flow channel and said passage;

a duct disposed within said housing, in the vicinity of said flow diversion member and adapted to have mounted thereon a flame monitor in unobstructed communication with the interior of said combustion chamber;

an auxiliary vent disposed through said flow diversion member adjacent the inner aperture of said duct, in a manner to direct a flow of fluid across said aperture operably to divert product of combustion away therefrom;

said housing comprising a portion extending beyond said combustion chamber discharge portion; and said exterior flow channel outlet and said passage outlet being adapted to combine the flows emanating therefrom with the products of combustion emanating from said discharge portion in such a manner as to guide away from said housing portion the products of combustion emanating from said discharge portion.

10. A heating method comprising:

establishing a fuel-consuming flame within a combustion chamber having a wall and a discharge portion;

establishing a flow of combustion-supporting fluid within said combustion chamber;

controlling the temperature of said combustion chamber wall by means of a sheathe of fluid intermediate said flame and said wall, and a relatively sluggish flow of fluid past the exterior portion of said combustion chamber wall; and recapturing heat conveyed from the combustion chamber wall by said sheathe and said sluggish flow, by directing said sluggish flow into communication with the contents being discharged from said discharge portion.

11. A heating method comprising:

establishing a flame substantially along a longitudinal axis and in a combustion chamber comprising a discharge portion and a wall;

embracing said flame in a heated fluid annular envelope in a manner to separate said flame from said wall;

controlling the temperature of said wall by means of a relatively sluggish flow of fluid past the exterior portion thereof.

12. A heating method as defined in claim 11, and further characterized by:

said sluggish flow being defined by an exterior casing disposed in and separated from a housing;

capturing heat from said casing by means of an exterior flow between said casing and said housing, said exterior flow being at a greater rate than said sluggish flow;

said exterior flow and said sluggish flow combining with the products of combustion emitted from said discharge portion; and guiding in a manner to guide said products of combustion away from said housing.

13. In combination:
- a housing having parallel inwardly facing wall portions;
- a member disposed in said housing;
- a plurality of spacers disposed between said member and said wall portions;
- said spacers, with respect to said member and said housing, each being fixedly secured to one and slideably abutting the other;
- a guide bracket carried by said member; and
- adjustment means mounted on said housing and secured to said guide bracket, operably to vary the distance between said guide bracket and the location of said adjustment means on said housing.

14. Heating apparatus comprising:

a channel;

a blast tube having an inlet and an outlet disposed within said channel;

means for maintaining a flame emanating from said blast tube outlet, and comprising:
- means for injecting fuel into said blast tube;

an outwardly flared shield disposed about said blast tube outlet and terminating in an extremity;

a flow diversion member disposed downflow of said extremity and having a flow guide region of smaller effective diameter than that of said extremity;

said extremity and said flow guide region defining a port;

means for varying the size of said port;

a combustion chamber disposed downflow of said flow diversion member and having a discharge portion, and a combustion chamber wall disposed between said flow diversion member and said discharge portion;

said port being adapted to emit a fluid in a manner to embrace the flame emanating from said blast tube operably to shield said combustion chamber wall from contact with said flame;

a casing disposed about said wall and spaced therefrom operably to define a passage having an inlet portion and an outlet portion;

a housing disposed about said casing and spaced therefrom, operably to define an exterior flow channel therebetween;

means to guide fluid from said first-mentioned channel, through said flow diversion member and into said exterior flow channel and said passage;

a duct disposed within said housing, in the vicinity of said flow diversion member and adapted to have mounted thereon a flame monitor in unobstructed communication with the interior of said combustion chamber;

an auxiliary vent disposed through said flow diversion member adjacent the inner aperture of said duct, in a manner to direct a flow of fluid across said aperture operably to divert products of combustion away therefrom;

said housing comprising a portion extending beyond said combustion chamber discharge portion; and said exterior flow channel outlet and said passage outlet being adapted to combine the flows emanating therefrom with the products of combustion emanating from said discharge portion in such a manner as to guide away from said housing portion the products of combustion emanating from said discharge portion.

15. Heating apparatus comprising:

a channel;

a blast tube having an inlet and an outlet disposed within said channel;

means for maintaining a flame emanating from said blast tube outlet, and comprising:
    means for injecting fuel into said blast tube;

an outwardly flared shield disposed about said blast tube outlet and terminating in an extremity;

a flow diversion member disposed downflow of said extremity and having a flow guide region of smaller effective diameter than that of said extremity;

said extremity and said flow guide region defining a port;

means for varying the size of said port;

a combustion chamber disposed downflow of said flow diversion member and having a discharge portion, and a combustion chamber wall disposed between said flow diversion member and said discharge portion;

said port being adapted to emit a fluid in a manner to embrace the flame emanating from said blast tube operably to shield said combustion chamber wall from contact with said flame;

a casing disposed about said wall and spaced therefrom operably to define a passage having an inlet portion and an outlet portion;

a housing disposed about said casing and spaced therefrom, operably to define an exterior flow channel therebetween;

means to guide fluid from said first-mentioned channel, through said flow diversion member and into said exterior flow channel and said passage;

said housing comprising a portion extending beyond said combustion chamber discharge portion; and said exterior flow channel outlet and said passage outlet being adapted to combine the flows emanating therefrom with the products of combustion emanating from said discharge portion in such a manner as to guide away from said housing portion the products of combustion emanating from said discharge portion.

16. Heating apparatus comprising:

a channel;

a blast tube having an inlet and an outlet disposed within said channel;

means for maintaining a flame emanating from said blast tube outlet, and comprising;
    means for injecting fuel into said blast tube;

an outwardly flared shield disposed about said blast tube outlet and terminating in an extremity;

a flow diversion member disposed downflow of said extremity and having a flow guide region of smaller effective diameter than that of said extremity;

said extremity and said flow guide region defining a port;

means for varying the size of said port;

a combustion chamber disposed downflow of said flow diversion member and having a discharge portion, and a combustion chamber wall disposed between said flow diversion member and said discharge portion;

said port being adapted to emit a fluid in a manner to embrace the flame emanating from said blast tube operably to shield said combustion chamber wall from contact with said flame;

a duct disposed within said housing, in the vicinity of said flow diversion member and adapted to have mounted thereon a flame monitor in unobstructed communication with the interior of said combustion chamber;

an auxiliary vent disposed through said flow diversion member adjacent the inner aperture of said duct, in a manner to direct a flow of fluid across said aperture operably to divert products of combustion away therefrom.

17. Heating apparatus comprising:

a channel;

a blast tube having an inlet and an outlet disposed within said channel;

means for maintaining a flame emanating from said blast tube outlet, and comprising:
    means of injecting fuel into said blast tube;

a shield disposed about said blast tube outlet and terminating in an outwardly flared extremely disposed downflow of said blast tube outlet;

a flow diversion member disposed downflow of said extremity and having a flow guide region of smaller effective diameter than that of said extremity;

said extremity and said flow guide region defining a port;

a combustion chamber disposed downflow of said flow diversion member and having a discharge portion, and a combustion chamber wall disposed between said flow diversion member and said discharge portion;

said port being adapted to emit a fluid in a manner to embrace the flame emanating from said blast tube operably to shield said combustion chamber wall from contact with said flame;

a casing disposed about said wall and spaced therefrom operably to define a passage having an inlet portion and an outlet portion;

means to guide fluid from said first-mentioned channel, through said flow diversion member and into said passage;

said housing comprising a portion extending beyond said combustion chamber discharge portion; and said passage outlet being adapted to combine the flow emanating therefrom with the products of combustion emanating from said discharge portion in such a manner as to guide away from said housing portion the products of combustion emanating from said discharge portion.

18. Heating apparatus comprising:

a channel;

a blast tube having an inlet and an outlet disposed within said channel;

means for maintaining a flame emanating from said blast tube outlet, and comprising:
    means for injecting fuel into said blast tube;
    means for diverting a flow of combustion-supporting fluid in said blast tube, said flow comprising an inner flow adapted to intermix with said said fuel, and
    a helical outer flow adapted to form a sheathe about the flame emanating from said blast tube;

an outwardly flared shield disposed about said blast tube outlet and terminating in an extremity;

a flow diversion member disposed downflow of said extremity and having a flow guide region of smaller effective diameter than that of said extremity;

a combustion chamber disposed downflow of said flow diversion member and having a discharge portion, and a combustion chamber wall disposed between said flow diversion member and said discharge portion;

said port being adapted to emit a fluid in a manner to embrace said sheathe and flame operably to shield said combustion chamber wall from contact with said flame.

19. A heating apparatus comprising:

a combustion chamber having a combustion chamber wall portion leading to a discharge portion;

a casing disposed about said wall portion and spaced therefrom operably to define a passageway having an inlet portion and an outlet portion;

a channel leading to said inlet portion and adapted to convey fluid thereinto;

means to retard flow within said passageway; and said outlet portion being disposed in the vicinity of said discharge portion;

a housing disposed about said casing and spaced therefrom, operably to define a portion of an exterior flow channel therebetween;

said exterior flow channel being adapted to receive fluid from said first-mentioned channel, but at a substantially greater rate of flow than the rate of flow of fluid through said passageway;

said exterior flow channel having an outlet in the vicinity of said passageway outlet portion; and said exterior flow channel outlet and said passageway outlet being adapted to combine the flows emanating therefrom with the products of combustion emanating from said discharge portion;

said housing comprising a portion extending beyond said exterior flow channel and said combustion chamber discharge portion; and said exterior flow channel outlet being spaced from said housing and adapted to direct the flow of fluid emanating therefrom in such a manner as to guide away from said housing portion, the products of combustion emanating from said discharge portion.

20. A heating apparatus comprising:

a combustion chamber having a combustion chamber wall leading to a discharge portion;

a casing disposed about said wall portion and spaced therefrom operably to define a passageway having an inlet portion and an outlet portion;

means to guide combustion-supporting fluid to said combustion chamber and to said inlet portion;

means to retard flow within said passageway; and said outlet portion being disposed in the vicinity of said discharge portion;

a housing disposed about said casing and spaced therefrom, operably to define a portion of an exterior flow channel therebetween;

said exterior flow channel being adapted to receive fluid from said first-mentioned channel, but at a substantially greater rate of flow than the rate of flow of fluid through said passageway;

said exterior flow channel having an outlet in the vicinity of said passageway outlet portion; and said passageway outlet being adapted to combine the flows emanating therefrom with the products of combustion emanating from said discharge portion;

said housing comprising a portion extending beyond said exterior flow channel and said combustion chamber discharge portion; and said exterior flow channel outlet being spaced from said housing and adapted to direct the flow of fluid emanating therefrom in such a manner as to guide away from said housing portion, the products of combustion emanating from said discharge portion.

21. A heating method comprising:

establishing a flame substantially along a longitudinal axis and in a combustion chamber comprising a discharge portion and a wall;

disposing a helical sheathe of combustion-supporting fluid about said flame;

enveloping said helical sheathe in a fluid annular envelope intermediate said flame and said combustion chamber wall, said annular envelope comprising a flow substantially parallel to said longitudinal axis;

controlling the temperature of said combustion chamber wall by means of a relatively sluggish flow of fluid past the exterior portion of the combustion chamber wall.

22. A heating method comprising:

establishing a flame substantially along a longitudinal axis and in a combustion chamber comprising a discharge portion and a wall;

disposing a helical sheathe of combustion-supporting fluid about said flame;

enveloping said helical sheathe in a fluid annular envelope intermediate said flame and said combustion chamber wall, said annular envelope comprising a flow substantially parallel to said longitudinal axis;

said fluid annular envelope being itself capable of supporting combustion;

controlling the temperature of said wall by means of a relatively sluggish flow of fluid past the exterior portion thereof;

said sluggish flow being defined by an exterior casing disposed in and separated from a housing;

capturing heat from said casing by means of an exterior flow between said casing and said housing, said exterior flow being at a greater rate than said sluggish flow;

said exterior flow and said sluggish flow combining with the products of combustion emitted from said discharge portion in a manner to guide said products of combustion away from said housing;

disposing a flame monitor duct in communication with said combustion chamber; and directing a stream of fluid intermediate said duct and said flame, and across the aperture of said duct nearest said flame, operably to divert products of combustion away from said aperture.

References Cited by the Examiner

UNITED STATES PATENTS

| | | | |
|---|---|---|---|
| 1,863,391 | 6/1932 | Bluemel | 263—19 |
| 1,990,695 | 2/1935 | Jerome | 158—73 |
| 2,439,554 | 4/1948 | Anderson | 158—1.5 |
| 2,518,364 | 8/1950 | Owen | 263—19 |

FOREIGN PATENTS

| | | |
|---|---|---|
| 663,707 | 8/1938 | Germany. |
| 669,944 | 1/1950 | Great Britain. |
| 168,969 | 7/1934 | Switzerland. |

CHARLES SUKALO, *Primary Examiner.*

JOHN J. CAMBY, *Examiner.*